Feb. 2, 1926.
C. F. BYRNE
TRACTOR HITCH
Filed June 6, 1921
1,571,319
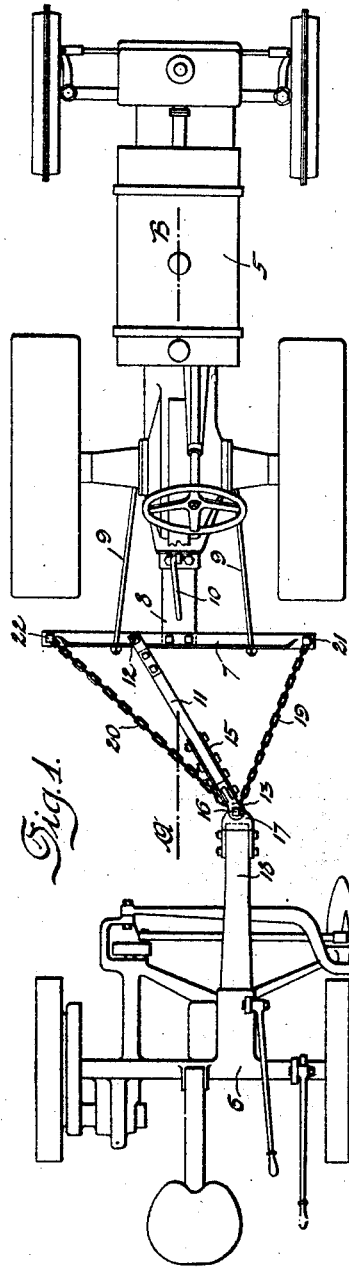
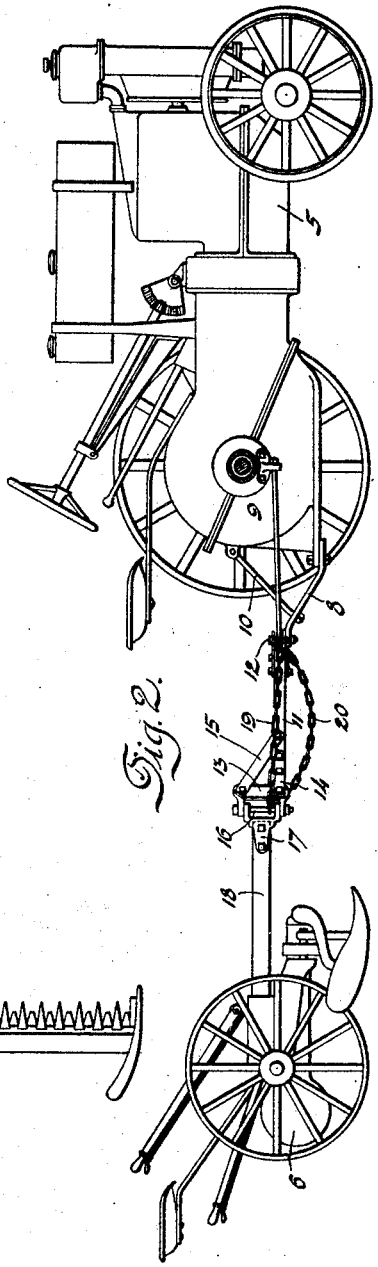
Inventor:
Charles F. Byrne
By his Attorneys:
Blackmore, Spencer & Flint Patented Feb. 2, 1926.

1,571,319

UNITED STATES PATENT OFFICE.

CHARLES F. BYRNE, OF JANESVILLE, WISCONSIN, ASSIGNOR TO GENERAL MOTORS CORPORATION, OF DETROIT, MICHIGAN, A CORPORATION OF DELAWARE.

TRACTOR HITCH.

Application filed June 6, 1921. Serial No. 475,357.

*To all whom it may concern:*

Be it known that I, CHARLES F. BYRNE, a subject of the King of Great Britain, and a resident of Janesville, county of Rock and State of Wisconsin, have invented certain new and useful Improvements in Tractor Hitches, of which the following is a full, clear, concise, and exact description, such as will enable others skilled in the art to which the invention relates to make and use the same, reference being made therein to the accompanying drawings, which form a part of this specification.

My invention relates to tractor hitch devices used for connecting a tractor with a farm implement or similar device to be drawn; and particularly to hitch devices designed for use with mowers and like machines wherein the draw bar or tongue of the implement is offset, so as to secure a proper balance between the wheels of the machine and the cutter bar located and operating to one side of the said wheels.

The object of my invention is to provide an improved tractor hitch of the type above referred to wherein the connection between the tractor and machine drawn is located to one side of the center line and line of travel of the tractor, the same having features of construction and operation whereby the operator may turn at substantially a right angle at the end of a field or swath, as well as features whereby the mower or similar implement drawn is forced away from the standing grain if and when it becomes necessary to back the same; which is often necessary in order to gain access to the cutter bar of the machine so that clogged material may be removed therefrom, or for other purposes which require that the cutter bar be free from the standing grain.

With the above and other objects of invention in view my invention consists in the improved tractor hitch device illustrated in the accompanying drawing and hereinafter described and claimed, and in such modifications and variations thereof, within the scope of the concluding claims, as will be obvious to those skilled in the art to which my invention relates.

Referring now to the drawing wherein the preferred embodiment of my invention is illustrated:

Figure 1 is a plan view showing a conventional tractor and mower connected together through and by means of my improved tractor hitch.

Figure 2 is a view showing the same devices, elements and features in side elevation.

In the drawing, the reference numeral 5 designates a suitable tractor and 6 a mower, reaper or similar machine; the latter being connected with the tractor so as to be drawn thereby through and by means of my improved tractor hitch device.

The elements comprising my improved tractor hitch and the features of construction, arrangement and operation thereof are substantially as follows: The reference numeral 7 designates a bar arranged transverse to the center line A—B and straight ahead path of travel of the tractor; and which bar is held in a fixed or substantially fixed position and relationship with the tractor as by means of a rearwardly extending plate 8 to the rear extremity of which said bar is fastened, two side brace rods 9 extending between said bar and the rear end of the tractor, and a central brace rod 10 extending from the plate 8 forwardly and the end of which is fastened to the rear end of the tractor chosen in illustrating my invention.

The numeral 11 designates a rigid draw bar the front end of which is pivotally connected with the transverse bar 7 at a point 12 adjacent the middle of the bar, and to the left of the center line A—B of the tractor, and which bar extends rearward and terminates in a position to the right of said center line. Said bar is provided at its rear end with means, such as a clevis 13, whereby and through which said rear end may be connected with a machine or device to be drawn, such as the mower 6 shown and hereinbefore referred to. Suitable plates 14, and brace bars 15 are shown as employed for effecting a connection between the draw bar and the clevis 13; although as regards these matters it will be appreciated that the end to be attained is the provision of a suitable connection between the bar and the machine to be drawn, rather than to provide a particular form or construction of connecting means or device. The clevis 13 is provided with a vertically extending bolt 16 which extends through holes in a clevis or head 17 secured to the free forward end of the tongue or draw bar 18 of the mower or similar implement to be drawn whereby a pivotal connection is provided between the implement and the rear end of the draw bar, as will be appreciated.

The reference numerals 19, 20 designates two tension members shown as chains the forward ends of which are connected with the transverse bar 7 at points 21, 22 adjacent the ends thereof; while the rear ends of said members are both connected with rear end of the draw bar 11 as by causing the bolt 16 to pass through the end link of each chain in the form of my invention shown. These chains taken together are longer than the distance from the point 21 to the bolt 16 and from there to the point 22, so that one or the other of the chains will hang loose or be slack when the hitch is in use; and so that the rear end of the draw bar may swing into either one of two extreme positions in each of which it is held and restrained from further movement by the taut one of the chains or equivalent tension members.

It will be appreciated that the pivotal connection provided by the bolt 12 extending through the hole in the transverse cross bar 7 is comparatively short in a vertical direction, from which it follows that pivotal movement between the front end of the draw bar 11 and the said transverse bar may occur in all directions; that is, the bar 7 may move up or down due to irregularities in the ground without straining the connection between the same and the front end of the draw bar because of the comparatively slight vertical length of the pivotal connection, and because of the necessary looseness between the parts; while as above explained said bar as a whole may swing freely about the pivot 12 in a horizontal plane during the backing of the implement drawn by the tractor and at the turning of the corners of the field. The pivotal connection between the rear end of the draw bar and the front end of the tongue 18, however, while of such character as to permit free sidewise swinging of the connected parts in a horizontal plane, acts, because of its considerable vertical length, to prevent upward or downward movement of the connected parts; the clevis 13 being of considerable length vertically and being rigidly held in a fixed position by the plates 14 and 15, as hereinbefore explained, and the pivot bolt 16 being of a length corresponding with the vertical dimensions of the clevis.

It therefore follows that free pivotal movement between the front end of the draw bar and the transverse bar 7 due to inequalities of the ground may occur at the pivotal point 12, said draw bar being in effect a continuation of the tongue 18 so far as concerns pivotal movement vertically between the two because the pivotal connection between it and the tongue is of such a character as to prevent vertical movement of both the front end of the tongue and the rear end of the draw bar; the pivotal movement between said front and rear ends being limited to swinging movement in a horizontal plane.

From the above it will be appreciated that the implement being drawn by the tractor is at all times free to follow thereafter whatever the condition of the ground may be as regards undulations therein, and whatever may be the vertical heights of the pivotal point 12 and of the center of draft of the implement; and that the center of draft of the implement and the pivotal point 12 always lie in one and the same straight line. In backing the implement, however, the comparatively great length vertically of the pivotal connection provided by the bolt 16 will prevent collapsing or folding of the parts at the joint between the front end of the reach and the rear end of the draft bar; the draft bar being always held in one horizontal plane by the pivotal connection aforesaid, and the backing force being under all conditions of operation communicated to the pivotal connection at the clevis by straight push through the draft bar and along the axis thereof and the same being subjected to no bending stresses during the backing of the implement.

When the tractor is moving straight ahead along the line of travel A—B the chain 19 will be taut, and the tractive force will be communicated from the fixedly secured transverse bar 7 to the mower or other implement through the link or draw bar 11 and the chain 19, both acting as tension members; the point of attachment at 16 between the rear ends of these members being held some little distance to the right of the center line A—B and line of travel by the conjoint action of the chain in question and the draw bar as will be clear from the drawing; so that the mower wheels will track substantially with the tractor wheels and a straight ahead pull will be communicated to the free forward end of the offset tongue of the mower, about which the resistance due to the action of the material being cut upon the cutter bar and to the weight and friction of the machine drawn are balanced. If, however, it should become necessary to back the tractor and mower force will be communicated to the latter through the draw bar 11 acting as a strut, the slack of the chain 20 being taken up and it becoming the taut chain, while the chain 19 becomes the loose chain upon the first rearward movement of the tractor. Thereafter and upon continued rearward movement of the tractor a pushing force will be communicated to the mower through the member 11 now subjected to compression and acting as a strut, the angular position of said member being determined by the chain 20 which is subjected to tension during the backing operation, as will be appreciated.

The rearward movement which causes the chain 20 to become taut and the chain 19 loose is accompanied by a movement of the forward end of the tongue 18 to the right before the machine drawn commences to move rearward; and thereafter, and as the tractor continues its backward movement, the mower will be moved to the left and away from the standing grass or grain; such movement being dependent upon the canting produced by the movement to the right of the end of the tongue and due, as the tractor continues its rearward movement, in part to the fact that the forward end of the tongue is held to the right of its position for straight ahead movement, and in part to the fact that the forces encountered are no longer balanced about the tongue as is the case during forward movement and when the cutter is in operation.

The improved hitch wherein my invention consists in addition to the result above referred to enables the operator to make a substantially right angular turn, and to cut approximately square corners at the ends of a field, the operation thereof in this respect being substantially as follows: Upon reaching the end of a swath the operator turns the tractor sharply to the right, during which the pivotal connection at 12 moves to the left; whereupon the chain 19 becomes slack because the end thereof connected to the bar 7 at 21 moves in a manner to shorten the distance between said point 21 and the pivotal connection at 16, and the chain 20 becomes taut because of the rapid swinging forward or relative forward movement of the connection at 22 between the end of said chain and the transverse bar. The chain 20 and the bar 11 now serve as an arm acting, as the tractor swings about an axis (or rather a series of axes) located well in front of the bar 7, to hold the front end of the tongue 18 of the mower outward and cause it to traverse a curve of much greater radius than would be the case if the mower was connected to the tractor through a freely swinging draw bar, as the tractor swings into its new course at the corner of a field. After the tractor has rounded the corner it is directed inward and toward the standing grain to bring it into a position alongside the same, and then turned sufficiently to the left to avoid running into the grain and place it in a position for straight ahead running upon its new course. This last left turn slackens the chain 20 and moves the point 21 forward faster than the rate of forward movement of the tractor as a whole, with the result that the chain 19 again becomes the taut chain and the mower is drawn ahead upon its new course by the bar 11 and by said chain both acting as tension members.

Having thus described my invention and explained the operation thereof, I claim and desire to secure by Letters Patent:

1. A tractor hitch of the class described comprising a transversely extending bar adapted to be secured to a tractor at the rear end thereof; a rigid draw bar the forward end of which is pivotally connected with said transverse bar adjacent the middle thereof; means at the rear end of said bar whereby a connection permitting pivotal movement between the parts connected in a horizontal plane only may be made between said rear end and an implement to be drawn; two tension members the rear ends of which are connected with the rear end of said draw bar, and the forward ends of which are connected with said transverse bar one adjacent each end thereof; and means whereby one only of said tension members is in operation at a time, according to the angular position relative to said transverse bar assumed by said draw bar when the device is in use.

2. A tractor hitch of the class described comprising a transversely extending bar adapted to be secured to a tractor at the rear end thereof; a rigid draw bar the forward end of which is pivotally connected with said transverse bar at one side of the center line of the tractor, and which draw bar extends to and the rear end of which lies upon the other side of the center line aforesaid; two tension members the rear ends of which are connected with the rear end of said draw bar and the forward ends of which are connected with said transverse bar one adjacent each end thereof; and means for providing a connection between the rear end of said draw bar and an implement to be drawn of such a character as to permit swinging movement in a horizontal plane, but not in other directions.

3. The combination with a tractor of a hitch comprising a rigid draw bar pivoted at its forward end to the tractor and pivotally connected at its rear end to an implement to be drawn in such a manner as to permit swinging movement in a horizontal plane between the connected parts, but to restrain movement in other directions; and two flexible tension members connected at their rear ends to the rear end of the draw bar and at their forward ends to the tractor upon opposite sides of the draw bar; the draw bar having a lateral swinging movement about its forward end and which movement is limited by the said flexible members.

In testimony whereof I affix my signature.

CHARLES F. BYRNE.